(12) United States Patent
Martin

(10) Patent No.: US 6,536,750 B1
(45) Date of Patent: Mar. 25, 2003

(54) MOTION RESTRAINT SYSTEM FOR VIBRATORY APPARATUS

(75) Inventor: Larry Martin, Indiana, PA (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/535,491

(22) Filed: Mar. 24, 2000

(51) Int. Cl.⁷ .............................................. B65G 27/08
(52) U.S. Cl. ..................... 267/136; 198/752.1; 198/763
(58) Field of Search .................. 198/763, 750.1, 198/752.1, 758; 267/136

(56) References Cited

U.S. PATENT DOCUMENTS

| | | | | |
|---|---|---|---|---|
| 3,032,174 A | * | 5/1962 | Lake et al. | 198/220 |
| 3,656,649 A | * | 4/1972 | Martin | 206/305 |
| 4,162,778 A | * | 7/1979 | Kraft | 248/610 |
| 4,218,929 A | * | 8/1980 | Spurlin | 74/61 |
| 4,463,816 A | * | 8/1984 | MacFarlane | 177/119 |
| 4,530,431 A | * | 7/1985 | Spurlin | 198/534 |
| 4,880,106 A | * | 11/1989 | Falconer et al. | 198/763 |
| 5,215,344 A | * | 6/1993 | Augustyniak | 294/19.1 |
| 5,782,430 A | * | 7/1998 | Mouille | 244/17.27 |
| 6,202,994 B1 | * | 3/2001 | Spurlin | 198/752.1 |

* cited by examiner

Primary Examiner—Matthew C. Graham
Assistant Examiner—Melody M Burch
(74) Attorney, Agent, or Firm—Wood, Phillips, Katz, Clark & Mortimer

(57) ABSTRACT

A motion restraint system is disclosed for use in association with a vibratory apparatus, such as a vibratory conveyor. The motion restraint system comprises a flexible restraint member which is positioned to extend generally laterally of the associated vibratory apparatus. A connector member connects the vibratory apparatus to the flexible restraint member so that lateral motion of the vibratory apparatus is restrained. At the same time, horizontal and vertical vibratory motion of the apparatus is permitted. Elastomeric isolation elements are positioned for operative engagement with opposite ends of the flexible restraint member to absorb the horizontal and vertical motions imparted to the flexible restraint member by the vibratory apparatus.

3 Claims, 4 Drawing Sheets

MOTION RESTRAINT SYSTEM FOR VIBRATORY APPARATUS

TECHNICAL FIELD

The present invention relates generally to a motion restraint system for a vibratory apparatus such as a vibratory conveyor, and more particularly to an arrangement whereby lateral movement of the vibratory apparatus is restrained while permitting longitudinal and vertical vibratory motion of the apparatus.

BACKGROUND OF THE INVENTION

Vibratory conveyors and like vibratory apparatus have found widespread use in various types of material-handling applications. These types of devices, typically configured as elongated troughs or trays, are arranged to permit limited longitudinal or longitudinal/vertical motion, such as by mounting of the trough of the apparatus on suspension cables, on elastomeric elements, or by like arrangements. Vibratory motion is induced in the apparatus by mechanical drives (sometimes referred to as exciters), or by electromagnetic drives. Vibratory motion of the apparatus acts to convey material therein, permitting the material to be handled in a gentle fashion, as may be required, and avoiding the complexities of conveyor belts and like arrangements.

Typically, these types of vibratory machines function as feeders or conveyors, and are frequently used to meter the flow of bulk material, or to convey bulk material from one point to another during processing. By way of example, use of these types of vibratory conveyors is widespread in the snack food industry, where they can be advantageously employed to meter products such as potato chips, popcorn, corn chips and the like from storage bins, or to convey and distribute products of this type from cooking processes to packaging machinery.

As will be appreciated, the dynamic forces generated by the operation of such equipment must be isolated from associated support structures, and building structures housing such equipment, to prevent unwanted noise and vibration of the support and building structures, or in the worst case, fatigue and failure of structural components. Isolation systems have been developed to prevent transmission of such forces that are highly efficient, and which are lightly damped in all six degrees of movement (i.e., vertically up and down, longitudinally back and forth, and laterally left and right), thereby allowing the isolated vibratory apparatus to freely move on its isolation system.

Experience has shown that configuring vibratory equipment for movement along all three axes can create problems in those applications where it is necessary to align various pieces of equipment, such as the discharge of one conveyor to the inlet of another. This can be particularly troublesome in those applications where the isolation system for the apparatus uses long suspension cables to achieve the desired application, such as in a single mass machine with a differential motion conveyor. While the differential motion conveyor has virtually no vertical component of vibration (hence the length of the cables to ensure this), it has a relatively large horizontal motion which, coupled with the length of the suspension cables, can undesirably result in erratic, high amplitude swinging of the conveyor, if any unbalanced, off-axis forces are present. Such forces are difficult to eliminate entirely because even geometric manufacturing tolerances over a long conveyor can create a dynamic, unbalanced force sufficient to initiate a swinging motion in the conveyor.

Lateral swinging motion of a conveyor can particularly complicate maintaining the conveyor's alignment, and undesirably result in product spills at transition points, contributing to product loss, as well as sanitation and clean-up expenses. While it is known to limit lateral motion of a conveyor, such as by providing stationary tracks upon which a suspended conveyor rides, such systems are not only costly to install and maintain, they do not always constrain the unwanted motion, can be noisy and difficult to clean, and can add considerably to the cost of installation for the conveyor arrangement.

SUMMARY OF THE INVENTION

The present invention contemplates an arrangement for restraining lateral movement of a vibratory apparatus, such as a vibratory conveyor, which comprises a desirably straightforward and relatively low cost design. The present system is easy to install, straightforward to maintain and clean, is of a sanitary construction, and is quiet in operation. While the present disclosure illustrates the present motion restraint system in connection with a vibratory conveyor apparatus, it will be understood by those skilled in the art that the present system may find application in connection with controlling motion of other vibratory devices.

The motion restraint system of the present invention includes a pair of spaced apart support structures which are positioned in operative association with a vibratory apparatus such as a vibratory conveyor. In accordance with an illustrated embodiment of the invention, the spaced apart support structures comprise a pair of A-frame pedestals from which the vibratory conveyor apparatus is suspended. The support structures are fixedly mounted and anchored to the associated floor or like structure within which the vibratory apparatus is housed.

The present motion restraint system further includes a flexible restraint member which extends between and is connected to the spaced apart support structures. In the preferred form, the flexible restraint member comprises a wire rope which is positioned beneath the vibratory conveyor apparatus with opposite ends of the wire rope connected to the associated support structure. While the flexible restraint member is fitted to the associated support structures with sufficient tension so as to limit the range of flexible movement of the member, the member exhibits sufficient flexibility as to accommodate the normal vibratory movement of the associated apparatus, such as in the generally longitudinal direction thereof.

A connection element mounted on the vibratory apparatus is connected to the flexible restraint member intermediate the laterally spaced apart support structures. By this arrangement, the present system acts to restrain lateral movement of the vibratory apparatus while permitting movement thereof along the generally longitudinal direction. As will be recognized by those familiar with the art, some vibratory devices not only exhibit generally longitudinal movement, but vertical movement as well, and the configuration of the present restraint system, including a flexible restraint member connected to the vibratory apparatus, accommodates longitudinal and vertical vibratory motion, while acting to limit and restrain lateral motion of the apparatus.

The present system preferably includes a pair of isolation elements which are operatively interposed between the restraint member and the respective ones of the spaced apart support structures to isolate the support structures from the movement of the flexible restraint member. In the illustrated embodiment, the isolation elements comprise elastomeric elements respectively mounted on the support structures. Each elastomeric isolation element defines an internal passage through which the flexible restraint member extends. In this fashion, movement of the restraint member attendant to vibratory movement of the associated apparatus results in engagement of the restraint member with the isolation elements, thus cushioning the horizontal and vertical motions of the restraint member, abating or eliminating noise caused by the vibration, and desirably acting to prevent fatigue failure of the wire rope from which the restraint member is formed.

Other features and advantages of the present invention will become readily apparent from the following detailed description, the accompanying drawings, and the appended claims.

DETAILED DESCRIPTION

Figure 1:
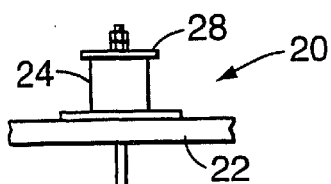
FIG. 1 is a fragmentary, side elevational view of a vibratory conveyor apparatus suspended from an associated structure such as a building beam.
Figure 1:
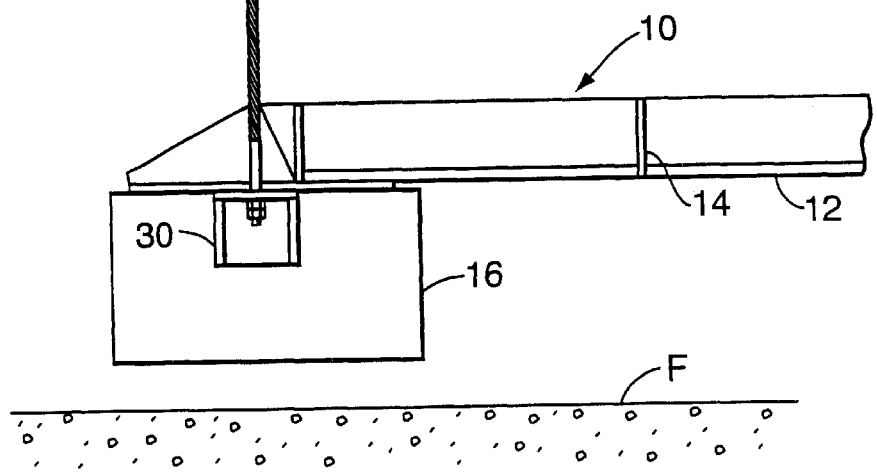

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

For purposes of the present disclosure, the present motion restraint system has been shown in operative association with a vibratory conveyor apparatus, which may be configured for vibratory motion generally along the longitudinal direction thereof, or vibratory motion along both longitudinal and vertical directions with respect to the conveyor bed. However, as will be recognized by those skilled in the art, a motion restraint system embodying the principles of the present invention can advantageously be employed for constraining lateral motion of any isolated vibrating machine. While general reference is made herein to restraint of lateral motion, it is to be understood that this term of orientation is intended to cover those applications wherein motion which is restrained is along an axis extending generally perpendicularly to the direction or directions of vibratory motion typically exhibited by the isolated vibrating machine.

With reference first to FIG. 1, therein is illustrated a typical vibratory apparatus, which for the present disclosure is illustrated as a differential motion vibratory conveyor apparatus 10. The vibratory conveyor apparatus includes a generally elongated trough along which material to be conveyed is carried, with interconnected longitudinal ribs 12 and lateral ribs 14 providing the trough with the necessary structural integrity for vibratory material conveyance. The illustrated embodiment includes a mechanical vibratory drive 16, such as a typical four-shaft exciter, but it will be understood that the motion restraint system of the present invention can be used in operative association with vibratory devices having other types of drive arrangements.

In this illustrative example, vibratory conveyor 10 is mounted by an overhead isolation system 20, as is known in the art. The isolation system 20 includes support beams 22 (one being illustrated) which often are a part of, or integrated into, the roof structure of a building within which the vibratory conveyor is housed. A spring isolator 24, typically comprising a steel coil spring or a rubber cylindrical spring, is positioned on the support beam 22, with one end of a suspension cable 26 (typically comprising wire rope) being attached thereto by a suitable threaded ferrule connected to the end of the suspension cable. The threaded ferrule extends through the spring isolator 24, and through an isolator top plate 28, with the threaded ferrule held in place by a suitable nut and lock nut threaded thereto. A mounting bracket 30 is attached to the vibratory conveyor, with the mounting bracket secured to the suspension cable 26 by another threaded ferrule passing through the mounting bracket, with a suitable nut and lock nut threaded on the ferrule to thereby suspend the vibratory conveyor for isolated, vibratory motion. Ordinarily, the isolation system 20 includes four suspension cables, respectively generally positioned at opposite ends and opposite sides of the vibratory conveyor.

The arrangement illustrated in FIG. 1 acts to isolate the dynamic forces generated by the vibratory apparatus from its support structure and the structure of the building within which the apparatus is housed. Typically, only one type of isolation system is used in any particular vibratory apparatus, with the understanding that opposite ends of the vibratory conveyor 10 can be supported and suspended by the isolation system 20 illustrated in FIG. 1.

Figure 2:
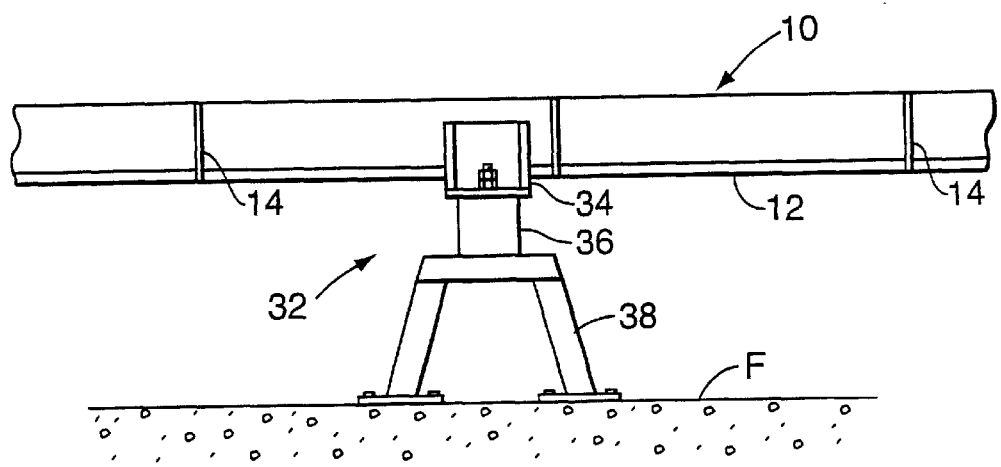
FIG. 2 is a fragmentary, side elevational view of a vibratory conveyor apparatus illustrating mounting on a floor mounted isolation system.

With reference to FIG. 2, an alternative form of isolation system is illustrated, i.e., floor mounted isolation system 32. This arrangement comprises a mounting bracket 34 attached to the trough of the vibratory conveyor apparatus 10, with one or more spring isolators 36 positioned beneath the mounting bracket. The spring isolators 36 are, in turn, mounted on one or more support pedestals 38 bolted to the associated support structure, such as concrete floor F. This type of isolation system is generally better suited for isolation of vibratory machines in which a vertical component of vibration is present, as well as a horizontal component.

Figure 3:
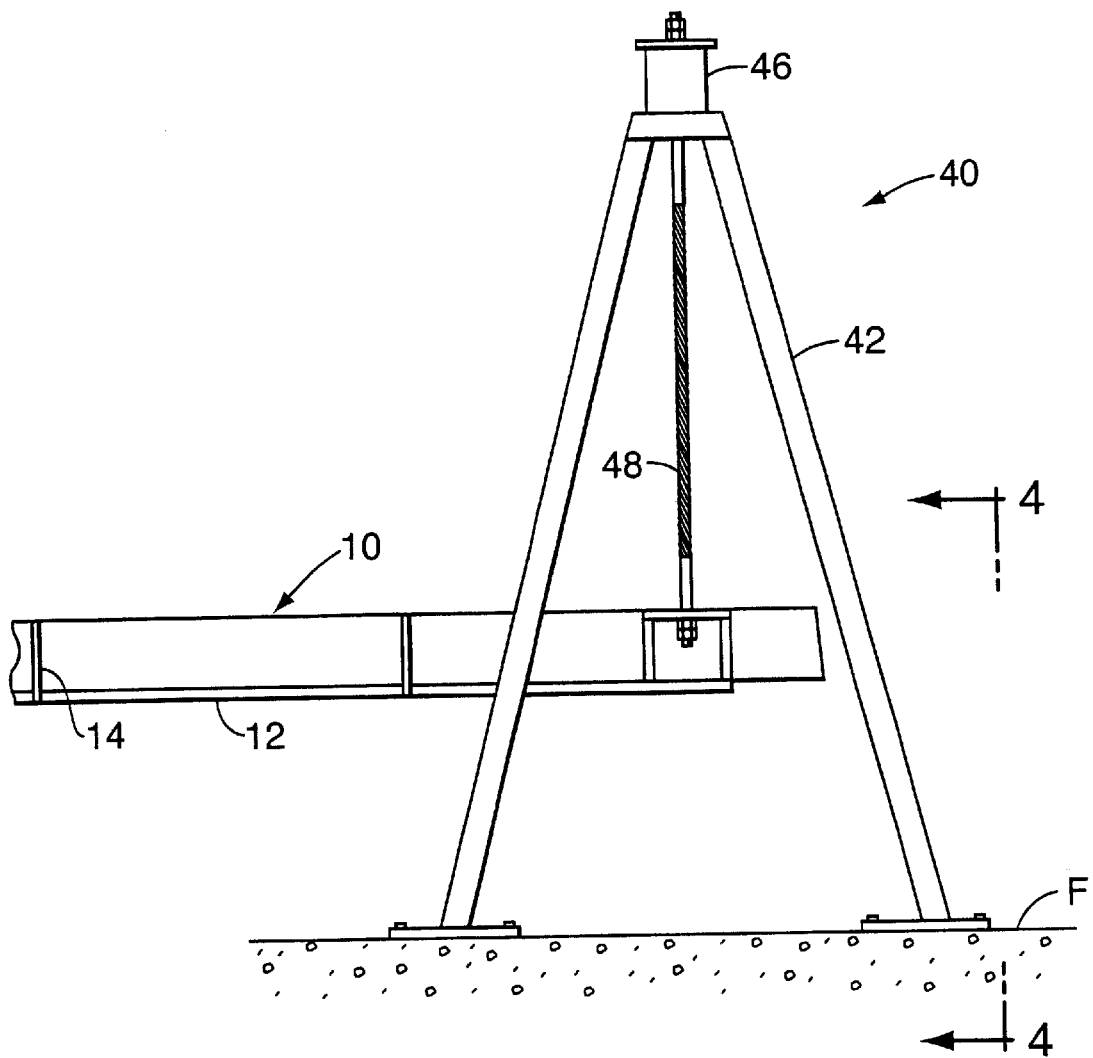
FIG. 3 is a fragmentary, side elevational view of a vibratory conveyor apparatus mounted on an A-frame isolation system.
Figure 4:
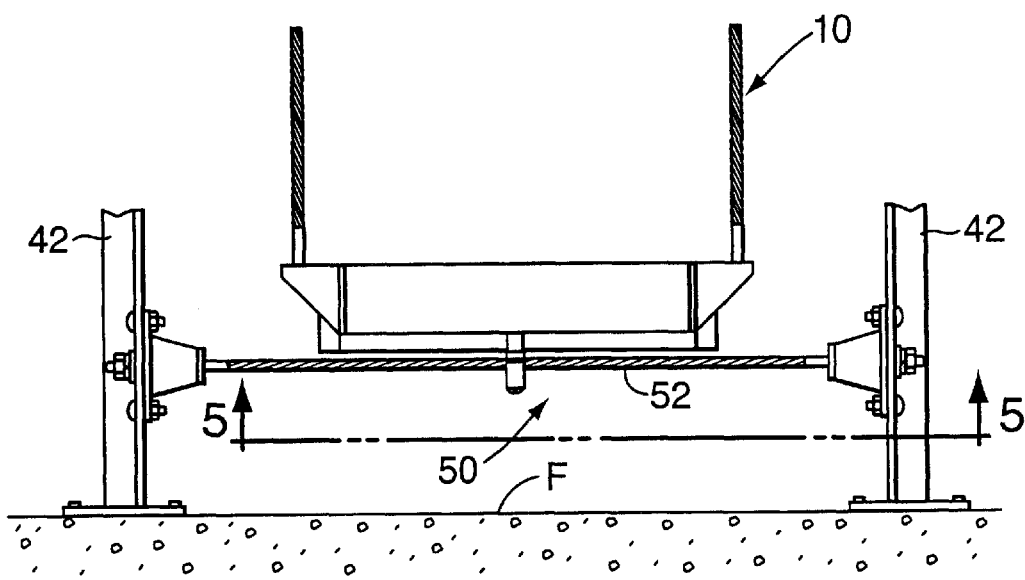
FIG. 4 is an end elevational view of a vibratory conveyor apparatus, illustrating a motion restraint system embodying the principles of the present invention.
Figure 5:
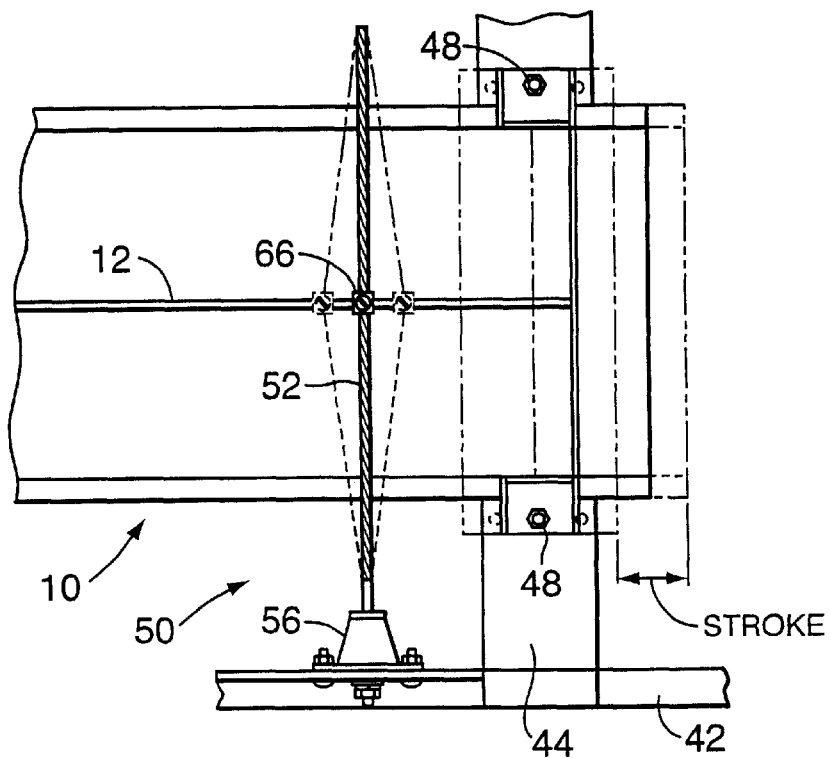
FIG. 5 is a view taken along lines 5—5 of FIG. 4.

FIG. 3 illustrates another form of isolation system, that is, an A-frame isolation system 40. In many respects, this system is similar to the overhead isolation system 20 described above, except that a pair of A-frame pedestals 42 provide support for the system, rather than overhead beams or the like. The relatively tall A-frame pedestals 42 are respectively positioned on each side of the conveyor, with a pair of the pedestals typically provided at each end of the conveyor. The A-frame pedestals are typically bolted to the associated support structure such as concrete floor F, with the isolation system further including a top member 44 (see FIG. 5) extending between the pedestals. Spring isolators 46 are positioned on top of the top member 44, with suspension cables 48 extending through the spring isolators for support of the conveyor trough, an arrangement which is essentially similar to the overhead isolation system described above.

With particular reference to FIGS. 4–7, therein is illustrated a motion restraint system 50 embodying the principles of the present invention. As will be described, the present motion restraint system acts to restrain lateral movement of the vibratory conveyor 10, while still permitting the vibratory conveyor to vibrate in a general longitudinal direction thereof The present restraint system also accommodates vertical motion of such a vibratory apparatus, while again restraining lateral motion. present restraint system includes a flexible restraint member 52 which extends between and is connected to a pair of laterally spaced apart support structures. In the illustrated embodiment, the spaced apart support structures are shown as A-frame pedestals 42. However, it will be understood that the support structures may be otherwise configured, and may be separate from the isolation system for the conveyor.

Figures 6, 7:
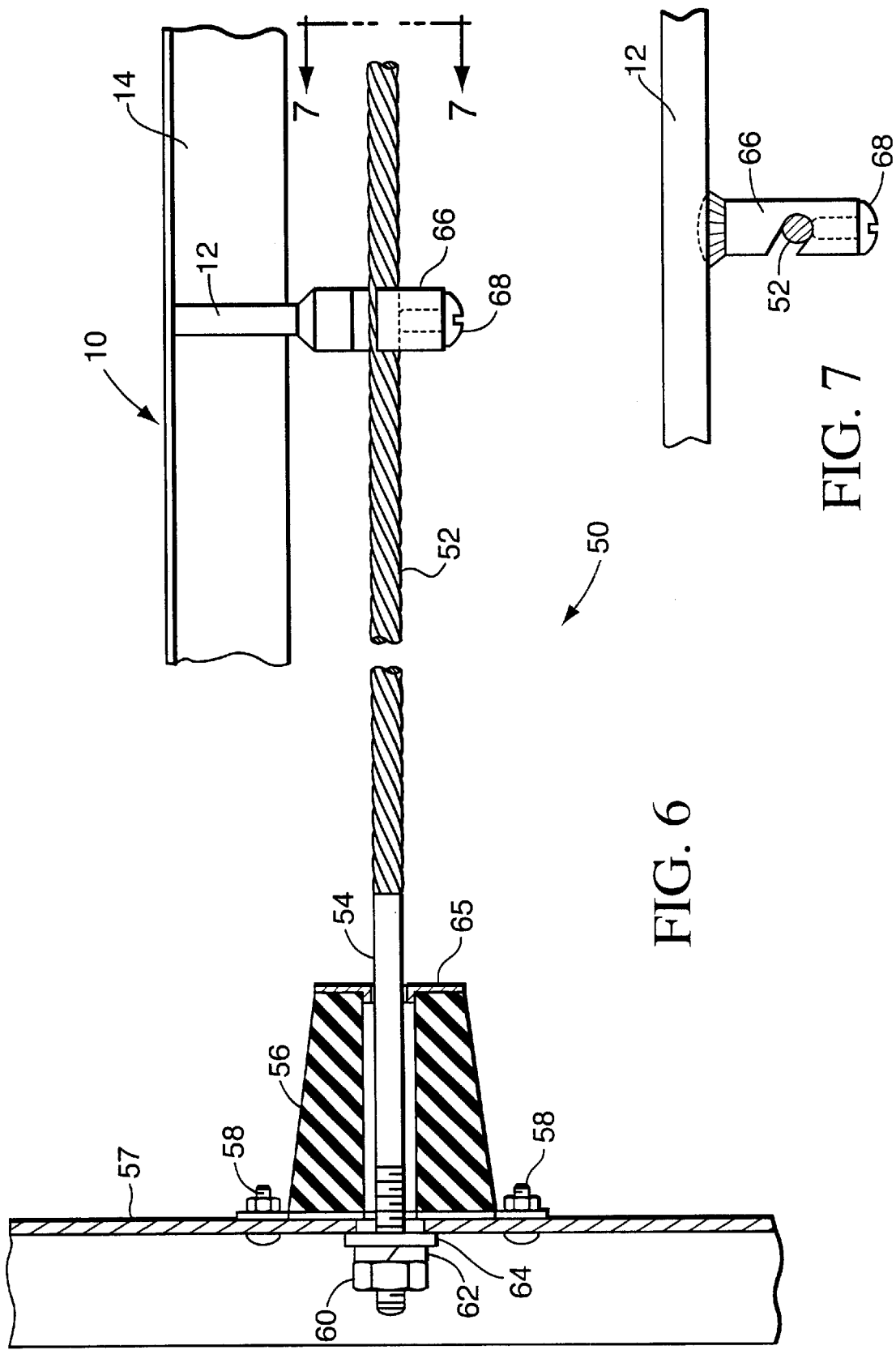
FIG. 6 is an enlarged, fragmentary view of the present motion restraint system.
FIG. 7 is a view taken along lines 7—7 of FIG. 6.

In the preferred form, the flexible restraint member 52 comprises a wire rope, with a threaded connector in the form of a threaded ferrule 54 fitted to each end of the wire rope (see FIG. 6). Other flexible elements can alternatively be employed for the member 52, such as a linked chain, a multi-link element, or like mechanical structures. The threaded ferrule 54 extends through an internal passage defined by each of a pair of spring isolation elements 56, preferably comprising elastomeric material. Each of the spring isolation elements is fitted to a flange portion 57 of the associated support structure by fasteners 58. Each threaded ferrule 54 extends through an internal passage defined by the respective isolation element, with the wire rope of the flexible restraint member made taut between the opposing legs of the A-frame pedestals by means of a threaded nut 60 and a suitable lock washer 62. In order to center the flexible restraint member within the associated elastomeric isolation element 56, shoulder washers 64, 65 are respectively positioned on the outboard and inboard sides of each isolation element. Inboard shoulder washer 65 is thus positioned for engagement with the threaded ferrule 54 of the flexible restraint member, whereby longitudinal and vertical motion of the restraint member is transmitted to the elastomeric isolation element.

The trough of the vibratory conveyor apparatus 10 is connected to the flexible restraint member 52 by a connector element comprising a clamp member 66 mounted on the lower side of the conveyor trough. The clamp member 66 is open-sided, and defines an opening for receiving the flexible restraint member 52 therein. A set screw 68 is threaded in the clamp member 66, and engages the flexible restraint member 52 to firmly fix the clamp member to the flexible restraint member 52.

For installation of the present system, the trough of the vibratory conveyor is centered on the wire rope of the flexible restraint member 52, and the set screw 68 of clamp member 66 tightened against the wire rope, pressing it against the wall of the hole drilled through the clamp that forms the bottom of the slot formed therein. Any lateral motion of the conveyor trough is substantially eliminated because the trough is clamped to the taut wire rope stretched between the legs of the A-frame pedestals 42. While lateral motion is restrained, horizontal and vertical motions are permitted because there is sufficient slack in the flexible restraint member, which can be achieved by suitable tensioning of the member between the associated support structures. The conveyor is therefore free to operate with both horizontal and vertical components of vibration, while the conveyor is restrained in the lateral direction should any unbalanced forces exist that would tend to cause such motion. The resilient rubber spring elements 52 desirably act to cushion the horizontal and vertical motions, thereby acting to prevent fatigue of the wire rope from which the restraint member is formed, and eliminating noise caused by vibration. For those applications requiring sanitary conditions (such as for food handling), stainless steel ferrules, fasteners, and plastic-covered wire rope can be used in the present construction.

From the foregoing, numerous modifications and variations can be effected without departing from the true spirit and scope of the novel concept of the present invention. It is to be understood that no limitation with respect to the specific embodiment disclosed herein is intended or should be inferred. The disclosure is intended to cover, by the appended claims, all such modifications as fall within the scope of the claims.

What is claimed is:

1. A motion restraint system comprising:

a vibratory conveyor apparatus movable in a generally longitudinal direction thereof;

a pair of laterally spaced apart support structures each having a flange portion;

a restraint member comprising a wire rope positioned beneath said vibratory conveyor apparatus, said wire rope extending between and having opposite ends connected to said support structures, said restraint member comprising a pair of threaded fittings respectively joined to opposite ends of said wire rope; each of said threaded fittings extending through the flange portion of a respective one of said support structures, with a pair of threaded fasteners respectively secured to said threaded fittings outboard of said flange portions so that said restraint member is maintained in tension between said flange portions;

a pair of elastomeric isolation elements operatively interposed between said restraint member and respective ones of said support structures, said restraint member extending through each of said isolation elements for engagement therewith so that longitudinal and vertical motion of said restraint member is transmitted to each said elastomeric isolation element; and a connector element comprising a clamp member mounted on said conveyor apparatus and connected to said restraint member by clamping engagement with said wire rope intermediate said laterally spaced apart support structures, to restrain lateral movement of said conveyor apparatus while permitting movement thereof in said generally longitudinal direction.

2. A motion restraint system in accordance with claim 1, wherein:

said pair of laterally spaced apart support structures comprises a pair of A-frame pedestals from which said conveyor apparatus is suspended.

3. A motion restraint system in accordance with claim 1, wherein:

each of said isolation elements is mounted on a respective one of said flange portions of said support structures on an inboard side thereof, each one of said isolation elements including a shoulder washer fitted to an inner portion thereof through which said restraint member extends for engagement thereof to transmit motion to said isolation elements.

* * * * *